United States Patent
Kamon et al.

(10) Patent No.: US 12,113,469 B2
(45) Date of Patent: Oct. 8, 2024

(54) ROBOT, HUMANOID ROBOT, AND ROBOT FALL CONTROL METHOD

(71) Applicant: KAWASAKI JUKOGYO KABUSHIKI KAISHA, Kobe (JP)

(72) Inventors: Masayuki Kamon, Akashi (JP); Junichi Karasuyama, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 235 days.

(21) Appl. No.: 17/784,687

(22) PCT Filed: Nov. 18, 2020

(86) PCT No.: PCT/JP2020/042960
§ 371 (c)(1),
(2) Date: Jun. 13, 2022

(87) PCT Pub. No.: WO2021/124773
PCT Pub. Date: Jun. 24, 2021

(65) Prior Publication Data
US 2023/0014536 A1   Jan. 19, 2023

(30) Foreign Application Priority Data

Dec. 17, 2019  (JP) ................. 2019-226950

(51) Int. Cl.
| | |
|---|---|
| *H02P 27/06* | (2006.01) |
| *B25J 9/12* | (2006.01) |
| *B25J 9/16* | (2006.01) |
| *B25J 13/08* | (2006.01) |
| *B25J 17/00* | (2006.01) |

(Continued)

(52) U.S. Cl.
CPC ............ *H02P 3/22* (2013.01); *B25J 9/126* (2013.01); *B25J 9/1628* (2013.01); *B25J 13/087* (2013.01); *B25J 17/00* (2013.01); *B25J 19/0004* (2013.01); *B62D 57/032* (2013.01); *H02P 5/46* (2013.01); *H02P 5/68* (2013.01)

(58) Field of Classification Search
CPC ...... H02P 3/22; H02P 5/46; H02P 5/68; H02P 27/06; B25J 9/126; B25J 9/1628; B25J 13/087; B25J 17/00; B25J 19/0004; B60L 7/22

See application file for complete search history.

(56) References Cited

U.S. PATENT DOCUMENTS

| 7,023,159 B2 * | 4/2006 | Gorti ................. H02P 3/12 318/432 |
|---|---|---|
| 2005/0005814 A1 * | 1/2005 | Kumar ............... B60L 7/22 105/35 |

(Continued)

FOREIGN PATENT DOCUMENTS

| JP | H3-98482 A | 4/1991 |
|---|---|---|
| JP | 2008-182821 A | 8/2008 |

(Continued)

*Primary Examiner* — Cortez M Cook
(74) *Attorney, Agent, or Firm* — METROLEX IP LAW GROUP, PLLC; Robert L. Scott, Esq.

(57) ABSTRACT

A robot (100) includes a resistance circuit (60) configured or programmed to perform a control to reduce a braking force of a dynamic brake by changing a resistance value of a resistance component (63) with respect to a power supply path (61) when motors (30) are stopped at an abnormal stop.

13 Claims, 7 Drawing Sheets

(51) Int. Cl.
  *B25J 19/00*      (2006.01)
  *B62D 57/032*     (2006.01)
  *H02P 3/22*       (2006.01)
  *H02P 5/46*       (2006.01)
  *H02P 5/68*       (2006.01)

(56) References Cited

U.S. PATENT DOCUMENTS

| 2017/0155344 | A1* | 6/2017 | Nishino | H02P 27/06 |
| 2017/0250645 | A1  | 8/2017 | Tateda  | |
| 2019/0260314 | A1* | 8/2019 | Mishima | G05B 19/19 |
| 2020/0083763 | A1* | 3/2020 | Nguyen  | B25J 9/0006 |

FOREIGN PATENT DOCUMENTS

| JP | 2017-153327 A | 8/2017 |
| JP | 2019-014008 A | 1/2019 |

* cited by examiner

1

ROBOT, HUMANOID ROBOT, AND ROBOT FALL CONTROL METHOD

TECHNICAL FIELD

The present invention relates to a robot, a humanoid robot, and a robot fall control method, and more particularly, it relates to a robot, a humanoid robot, and a robot fall control method, in which a dynamic brake is activated.

BACKGROUND ART

Conventionally, a robot in which a dynamic brake is activated is known. Such a robot is disclosed in Japanese Patent Laid-Open No. 3-098482, for example.

Japanese Patent Laid-Open No. 3-098482 discloses a motor control circuit using a regenerative circuit as a dynamic brake when a motor including a permanent magnet is braked. Furthermore, Japanese Patent Laid-Open No. 3-098482 describes that the motor control circuit can be applied to a machine type using a plurality of motors, such as a robot.

Specifically, the motor control circuit disclosed in Japanese Patent Laid-Open No. 3-098482 includes a motor and a drive circuit to drive the motor. The drive circuit includes transistors (transistors Tr1, Tr2, Tr3, and Tr4) including four bipolar transistors included in a bridge circuit. More specifically, the transistor Tr1 and the transistor Tr2 are connected in series to each other. Furthermore, the transistor Tr3 and the transistor Tr4 are connected in series to each other. The motor is connected between a connection point of the transistor Tr1 and the transistor Tr2 and a connection point of the transistor Tr3 and the transistor Tr4. Moreover, diodes D1, D2, D3, and D4 are connected in parallel to the four transistors Tr1, Tr2, Tr3, and Tr4, respectively. In addition, a regenerative power consumption resistor and a regenerative transistor that is turned on when regeneration occurs are connected in parallel to the transistor Tr1 and the transistor Tr2 that are connected in series to each other.

In the motor control circuit disclosed in Japanese Patent Laid-Open No. 3-098482, a supply of electric power to the motor is stopped when the motor is caused to make an emergency stop, and thus the motor is inertially rotated. At this time, the motor is in a power generation mode. In the power generation mode, the regenerative transistor is turned on. Thus, a closed path from the motor through the diode D1, the regenerative power consumption resistor, the regenerative transistor, and the diode D4 to the motor is formed. Therefore, electric power generated by the motor (the rotational energy of the motor) is consumed as heat by the regenerative power consumption resistor. Consequently, the dynamic brake is applied to the motor, and thus a braking force acts on the motor.

PRIOR ART

Patent Document

Patent Document 1: Japanese Patent Laid-Open No. 3-098482

SUMMARY OF THE INVENTION

Problems to be Solved by the Invention

However, as in the motor control circuit disclosed in Japanese Patent Laid-Open No. 3-098482, when the application of the dynamic brake to the motor is continued until the motor is stopped when the motor is caused to make an emergency stop, the braking force of the dynamic brake for the motor may conceivably be too strong. In particular, when the motor control circuit disclosed in Japanese Patent Laid-Open No. 3-098482 is applied to a motor of a bipedal walking robot such as a humanoid robot, the robot suddenly stops due to the too strong braking force of a dynamic brake at an emergency stop (at an abnormal stop). Consequently, the robot may disadvantageously be damaged by a vigorous fall of the robot. When the motor control circuit disclosed in Japanese Patent Laid-Open No. 3-098482 is applied to a motor of a quadrupedal walking robot, the quadrupedal walking robot does not fall at an emergency stop (at an abnormal stop) but may disadvantageously be damaged by the impact of the emergency stop.

The present invention is intended to solve the above problems. The present invention aims to provide a robot, a humanoid robot, and a robot fall control method each capable of significantly reducing or preventing damage to the robot or the humanoid robot at an abnormal stop.

Means for Solving the Problems

In order to attain the aforementioned object, a robot according to a first aspect of the present invention includes a robot body including a plurality of joints, a plurality of motors provided in the plurality of joints, and a resistance circuit including a resistance component electrically connectable to a power supply path that supplies electric power to the motors to consume electric energy generated by rotation of the motors, the resistance circuit activating a dynamic brake by consuming the electric energy by the resistance component. The resistance circuit is configured or programmed to perform a control to reduce a braking force of the dynamic brake by changing a resistance value of the resistance component with respect to the power supply path when the motors are stopped at an abnormal stop. The term "resistance circuit" indicates a broader concept including both a resistance circuit configured by hardware and a resistance circuit including at least a portion configured by software. Furthermore, the term "resistance component" indicates a broader concept including a resistor and a resistance component of a semiconductor element. In addition, the term "abnormal stop" indicates a broader concept including the emergency stop of a robot by a user's operation and the abnormal stop of a robot due to an abnormality.

In the robot according to the first aspect of the present invention, as described above, the resistance circuit is configured or programmed to perform a control to reduce the braking force of the dynamic brake by changing the resistance value of the resistance component with respect to the power supply path when the motors are stopped at the abnormal stop. Accordingly, when the motors are stopped at the abnormal stop, the braking force of the dynamic brake is reduced, and thus the robot stops relatively gently. Thus, when the robot is a bipedal walking robot like a humanoid robot, a vigorous fall of the robot is significantly reduced or prevented. That is, the robot gently collapses. When the robot is a quadrupedal walking robot, the impact of an emergency stop can be mitigated. Consequently, damage to the robot at the abnormal stop can be significantly reduced or prevented.

When the braking force of the dynamic brake is too strong, the robot may fall with the joints of the robot being fixed by the strong braking force of the dynamic brake. This may also damage the robot. On the other hand, in the robot according to the first aspect of the present invention, a control is performed to reduce the braking force of the dynamic brake, as described above, such that fixing of the joints by the strong braking force of the dynamic brake is significantly reduced or prevented, and thus damage to the robot caused by the fall of the robot with the joints being fixed can be significantly reduced or prevented. In particular, when the present invention is applied to a humanoid robot, fixing of the joints (shoulder joints and knee joints) by the strong braking force with arms being raised and knees being extended can be significantly reduced or prevented, and the humanoid robot can fall while the arms are gradually lowered and the knees are gradually bent (crouched down) by the reduced weak braking force. Thus, damage especially to the humanoid robot caused by a fall can be effectively significantly reduced or prevented.

A humanoid robot according to a second aspect of the present invention includes a humanoid robot body including a plurality of joints corresponding to a plurality of human joints, a plurality of motors provided in the plurality of joints, and a resistance circuit including a resistance component electrically connectable to a power supply path that supplies electric power to the motors to consume electric energy generated by rotation of the motors, the resistance circuit activating a dynamic brake by consuming the electric energy by the resistance component. The resistance circuit is configured or programmed to perform a control to reduce a braking force of the dynamic brake by changing a resistance value of the resistance component with respect to the power supply path when the motors are stopped at an abnormal stop. The term "resistance circuit" indicates a broader concept including both a resistance circuit configured by hardware and a resistance circuit including at least a portion configured by software. Furthermore, the term "resistance component" indicates a broader concept including a resistor and a resistance component of a semiconductor element. In addition, the term "abnormal stop" indicates a broader concept including the emergency stop of a robot by a user's operation and the abnormal stop of a robot due to an abnormality.

In the humanoid robot according to the second aspect of the present invention, as described above, the resistance circuit is configured or programmed to perform a control to reduce the braking force of the dynamic brake by changing the resistance value of the resistance component with respect to the power supply path when the motors are stopped at the abnormal stop. Accordingly, when the motors are stopped at the abnormal stop, the braking force of the dynamic brake is reduced, and thus the humanoid robot stops relatively gently. Thus, a vigorous fall of the humanoid robot is significantly reduced or prevented. That is, the humanoid robot gently collapses. Consequently, damage to the humanoid robot at the abnormal stop can be significantly reduced or prevented.

When the braking force of the dynamic brake is too strong, the humanoid robot may fall with the joints of the humanoid robot being fixed by the strong braking force of the dynamic brake. This may also damage the humanoid robot. On the other hand, in the humanoid robot according to the second aspect of the present invention, a control is performed to reduce the braking force of the dynamic brake, as described above, such that fixing of the joints by the strong braking force of the dynamic brake is significantly reduced or prevented, and thus damage to the humanoid robot caused by the fall of the humanoid robot with the joints being fixed can be significantly reduced or prevented. Furthermore, fixing of the joints (shoulder joints and knee joints) by the strong braking force with arms of the humanoid robot being raised and knees of the humanoid robot being extended can be significantly reduced or prevented, and the humanoid robot can fall while the arms are gradually lowered and the knees are gradually bent (crouched down) by the reduced weak braking force. Thus, damage especially to the humanoid robot caused by a fall can be effectively significantly reduced or prevented.

A robot fall control method according to a third aspect of the present invention is a fall control method at an abnormal stop for a robot including a plurality of joints, and includes detecting a voltage in a power supply path that supplies electric power to a plurality of motors provided in the plurality of joints, and performing a feedback control to reduce a braking force of a dynamic brake by changing a resistance value of a resistance component with respect to the power supply path in a resistance circuit that activates the dynamic brake by consuming electric energy generated by rotation of the motors by the resistance component electrically connectable to the power supply path, based on the detected voltage in the power supply path. The term "resistance circuit" indicates a broader concept including both a resistance circuit configured by hardware and a resistance circuit including at least a portion configured by software. Furthermore, the term "resistance component" indicates a broader concept including a resistor and a resistance component of a semiconductor element. In addition, the term "abnormal stop" indicates a broader concept including the emergency stop of a robot by a user's operation and the abnormal stop of a robot due to an abnormality.

As described above, the robot fall control method according to the third aspect of the present invention includes performing a feedback control to reduce the braking force of the dynamic brake by changing the resistance value of the resistance component with respect to the power supply path in the resistance circuit that activates the dynamic brake by consuming the electric energy generated by the rotation of the motors by the resistance component electrically connectable to the power supply path, based on the detected voltage in the power supply path. Accordingly, when the motors are stopped at the abnormal stop, the braking force of the dynamic brake is reduced, and thus the robot stops relatively gently. Thus, when the robot is a bipedal walking robot like a humanoid robot, a vigorous fall of the robot is significantly reduced or prevented. That is, the robot gently collapses. When the robot is a quadrupedal walking robot, the impact of an emergency stop can be mitigated. Consequently, it is possible to provide the robot fall control method capable of significantly reducing or preventing damage to the robot at the abnormal stop.

When the braking force of the dynamic brake is too strong, the robot may fall with the joints of the robot being fixed by the strong braking force of the dynamic brake. This may also damage the robot. On the other hand, in the robot according to the third aspect of the present invention, a control is performed to reduce the braking force of the dynamic brake, as described above, such that fixing of the joints by the strong braking force of the dynamic brake is significantly reduced or prevented, and thus it is possible to provide the robot fall control method capable of significantly reducing or preventing damage to the robot caused by the fall of the humanoid robot with the joints being fixed. In particular, when the present invention is applied to a humanoid robot, fixing of the joints (shoulder joints and knee joints) by the strong braking force with arms being raised and knees being extended can be significantly reduced or prevented, and the humanoid robot can fall while the arms are gradually lowered and the knees are gradually bent (crouched down) by the reduced weak braking force. Thus, it is possible to provide the robot fall control method capable of effectively significantly reducing or preventing damage especially to the humanoid robot caused by a fall.

Effect of the Invention

According to the present invention, as described above, it is possible to significantly reduce or prevent the damage at an abnormal stop.

MODES FOR CARRYING OUT THE INVENTION

An embodiment embodying the present invention is hereinafter described on the basis of the drawings.

The configuration of a humanoid robot 100 (humanoid robot body 100a) according to this embodiment is now described with reference to FIGS. 1 to 4. The humanoid robot 100 is also called a humanoid. The humanoid robot 100 and the humanoid robot body 100a are examples of a "robot" and a "robot body" in the claims, respectively.

Figure 1:
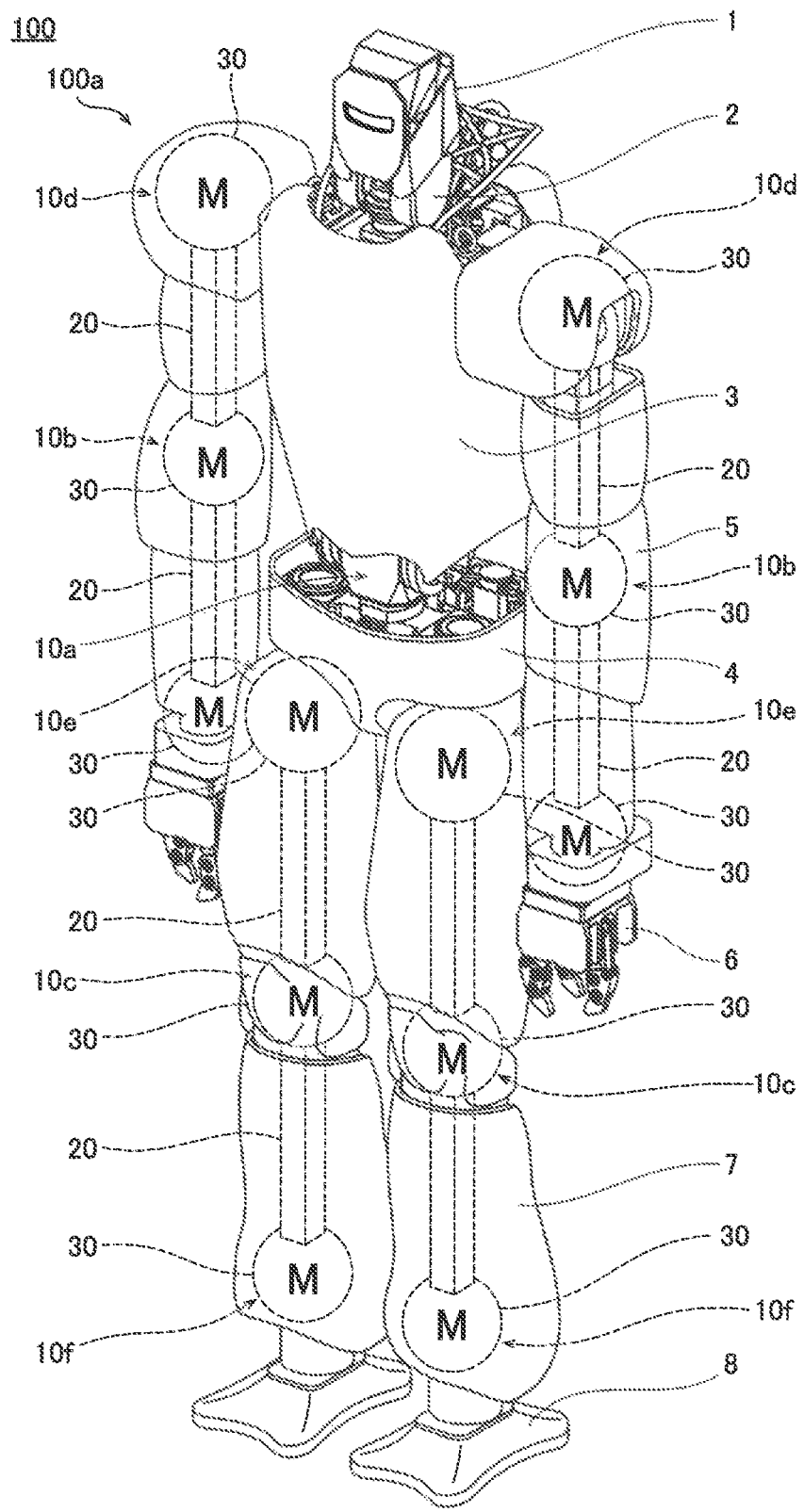
FIG. 1 is a perspective view of a humanoid robot according to an embodiment of the present invention.

As shown in FIG. 1, the humanoid robot 100 includes a head 1, a neck 2, an upper torso 3, a lower torso 4, arms 5, hands 6, legs 7, and feet 8. The upper torso 3 and the lower torso 4 are flexibly connected to each other via a waist joint 10a. Thus, the upper torso 3 can perform a forward bending motion, a backward bending motion, and a right/left turning motion with respect to the lower torso 4. The lower torso 4 corresponds to a human pelvis. The waist joint 10a corresponds to a human waist.

Each of the arms 5 has a plurality of links 20 and an elbow joint 10b that supports the plurality of links 20 such that the plurality of links 20 are flexible. The adjacent links 20 flex relative to each other via the elbow joint 10b such that the arm 5 performs a flexing motion.

The hands 6 are provided at the tip ends of the arms 5. Each of the hands 6 includes a plurality of links (not shown) and knuckles (not shown) that support the plurality of links such that the plurality of links are flexible.

Each of the legs 7 includes a plurality of links 20 and a knee joint 10c that supports the plurality of links 20 such that the plurality of links 20 are flexible. The adjacent links 20 flex relative to each other via the knee joint 10c such that the leg 7 performs a flexing motion. The feet 8 are moved by controlling the flexing motions of the legs 7 such that the humanoid robot 100 can perform bipedal walking.

The upper torso 3 and the arms 5 are connected to each other by shoulder joints 10d. The lower torso 4 and the legs 7 are connected to each other by hip joints 10e. The legs 7 and the feet 8 are connected to each other by ankle joints 10f. The waist joint 10a, the elbow joints 10b, the knee joints 10c, the shoulder joints 10d, the hip joints 10e, and the ankle joints 10f are examples of a "joint" in the claims.

Motors 30 are provided in the waist joint 10a, the elbow joints 10b, the knee joints 10c, the shoulder joints 10d, the hip joints 10e, and the ankle joints 10f to drive the waist joint 10a, the elbow joints 10b, the knee joints 10c, the shoulder joints 10d, the hip joints 10e, and the ankle joints 10f. The waist joint 10a, the elbow joints 10b, the knee joints 10c, the shoulder joints 10d, the hip joints 10e, and the ankle joints 10f are driven by the motors 30 such that the humanoid robot 100 performs a flexing motion and a turning motion. Actually, joints and motors 30 are also provided in portions other than the portions shown in FIG. 1, but illustration thereof is omitted for the sake of simplification of the description.

Figure 2:
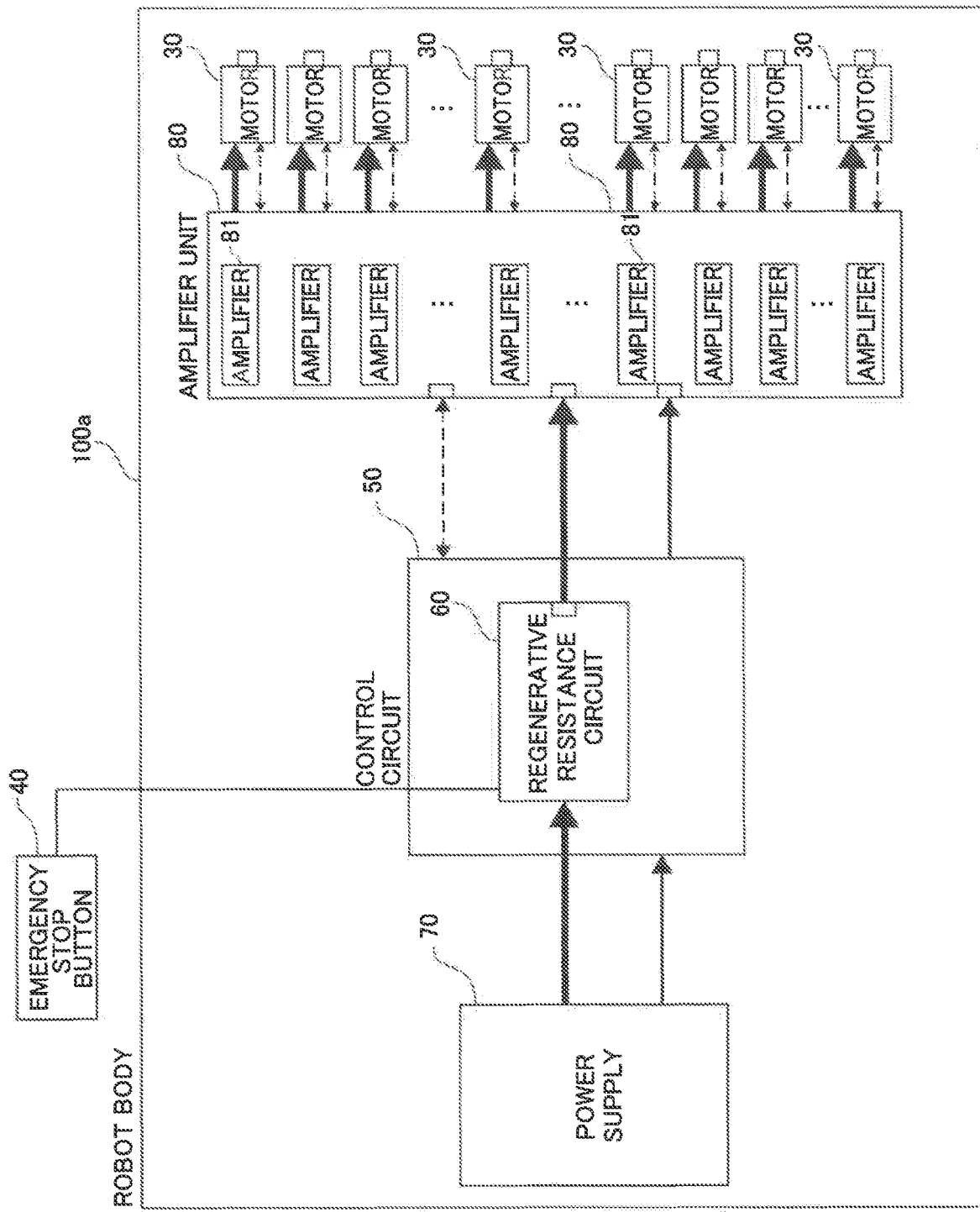
FIG. 2 is a block diagram of the humanoid robot (humanoid robot body) according to the embodiment of the present invention.

As shown in FIG. 2, the humanoid robot 100 (humanoid robot body 100a) includes a control circuit 50 including a regenerative resistance circuit 60, a power supply 70, and an amplifier unit 80 in addition to the motors 30 described above. The control circuit 50 outputs a command to the amplifier unit 80. In FIG. 2, a broken line arrow represents a communication signal. A thin solid arrow represents control electric power. A thick solid arrow represents motor electric power for driving the motor 30.

In this embodiment, motor drive electric power is supplied from the power supply 70 to the regenerative resistance circuit 60. The regenerative resistance circuit 60 supplies electric power to the amplifier unit 80 to drive the motors 30. The detailed configuration of the regenerative resistance circuit 60 is described below. The regenerative resistance circuit 60 is an example of a "resistance circuit" in the claims.

Control electric power is supplied from the power supply 70 to the control circuit 50. The control circuit 50 supplies electric power to control the amplifier unit 80.

The amplifier unit 80 includes a plurality of amplifiers (servo amplifiers) 81. An amplifier 81 is provided for each of a plurality of motors 30 provided in the waist joint 10a, the elbow joints 10b, the knee joints 10c, the shoulder joints 10d, the hip joints 10e, the ankle joints 10f (see FIG. 1), etc. The amplifiers 81 control driving of the motors 30.

Figure 3:
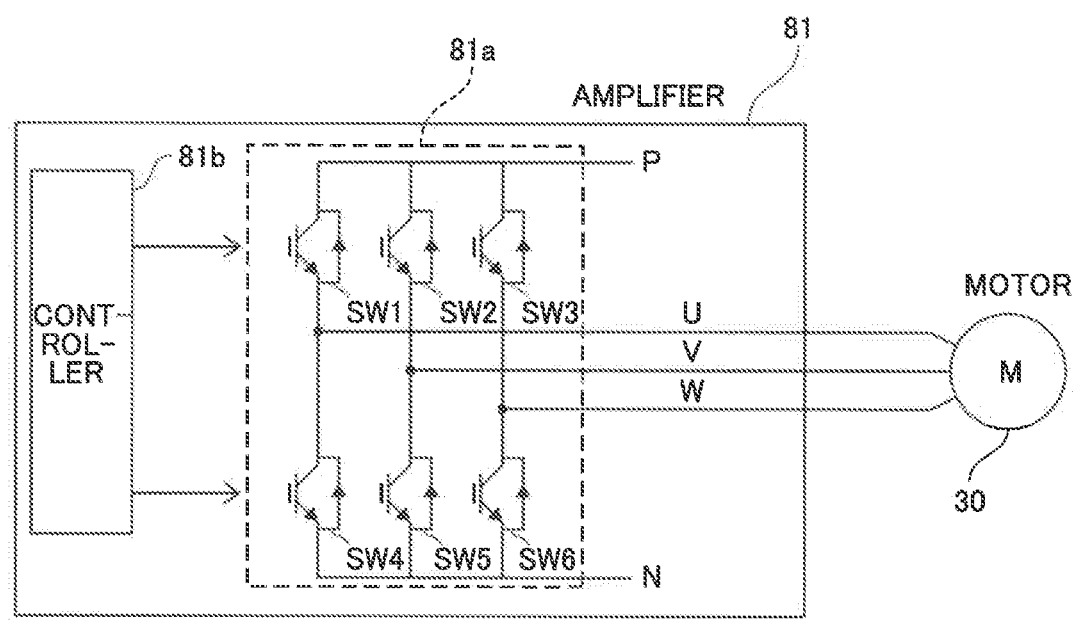
FIG. 3 is a circuit diagram of an amplifier of the humanoid robot according to the embodiment of the present invention.

As shown in FIG. 3, the amplifier 81 includes an inverter 81a and a controller 81b configured or programmed to control the inverter 81a. The inverter 81a includes three semiconductor switching elements SW1, SW2, and SW3 included in an upper arm, and three semiconductor switching elements SW4, SW5, and SW6 included in a lower arm. The semiconductor switching elements SW1 to SW6 are controlled to be turned on or off by the controller 81b such that electric power of desired three phases (U, V, and W) is supplied to the motor 30.

Detailed Configuration of Regenerative Resistance Circuit

The detailed configuration of the regenerative resistance circuit 60 according to this embodiment is now described with reference to FIGS. 2 and 4.

Figure 4:
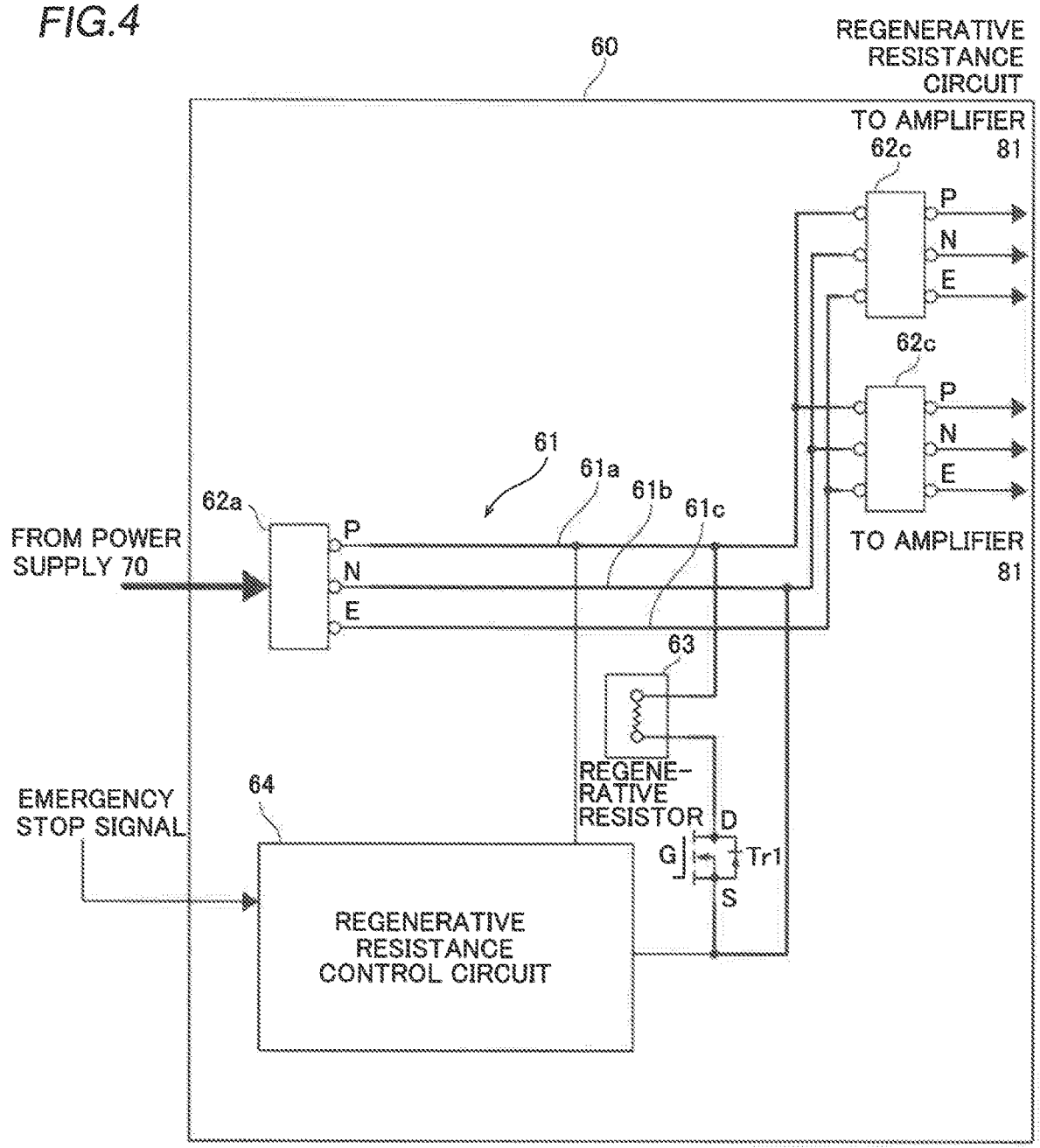
FIG. 4 is a circuit diagram of a regenerative resistance circuit of the humanoid robot according to the embodiment of the present invention.

As shown in FIG. 4, the regenerative resistance circuit 60 includes power supply wiring 61 to supply motor drive electric power from the power supply 70 (see FIG. 2) to the motors 30 (the amplifiers 81 of the amplifier unit 80). The power supply wiring 61 includes positive potential wiring 61a connected to a positive potential (P), negative potential wiring 61b connected to a negative potential (N), and ground potential wiring 61c connected to a ground potential (E). One end of the power supply wiring 61 is connected to a connector 62a connected to the power supply 70. The other end of the power supply wiring 61 is connected to a plurality of connectors 62c connected to the amplifiers 81 of the amplifier unit 80. The power supply wiring 61 is an example of a "power supply path" in the claims.

The regenerative resistance circuit 60 includes a regenerative resistor 63 electrically connectable to the power supply wiring 61 that supplies motor drive electric power to the motors 30. The regenerative resistor 63 consumes electric energy (regenerative energy) generated by rotation of the motors 30. Specifically, one end of the regenerative resistor 63 is connected to the positive potential wiring 61a, and the other end of the regenerative resistor 63 is connected to the negative potential wiring 61b via the transistor Tr1 described below. In this embodiment, the regenerative resistance circuit 60 performs a regenerative operation by the regenerative resistor 63 during normal operation, and performs an operation to activate a dynamic brake with a braking force being reduced using the regenerative resistor 63 at an emergency stop. This point is described in detail below. Also in the regenerative operation during normal operation, the dynamic brake with a braking force stronger than that at the emergency stop using the regenerative resistor 63 is activated. The regenerative resistor 63 is provided in advance in the general humanoid robot 100 in order to significantly reduce or prevent an increase in a voltage in the power supply wiring 61 in the regenerative operation during normal operation. The plurality of motors 30 are provided corresponding to the waist joint 10a, the elbow joints 10b, the knee joints 10c, the shoulder joints 10d, the hip joints 10e, and the ankle joints 10f whereas the regenerative resistor 63 is provided in common for the plurality of motors 30. The regenerative resistor 63 is an example of a "resistance component" in the claims. The emergency stop is an example of an "abnormal stop" in the claims.

The regenerative resistance circuit 60 includes the transistor Tr1. A gate G of the transistor Tr1 is connected to a regenerative resistance control circuit 64 described below. A drain D of the transistor Tr1 is connected to the regenerative resistor 63. A source S of the transistor Tr1 is connected to the negative potential wiring 61b. The transistor Tr1 is an example of a "switch" in the claims.

The regenerative resistance circuit 60 includes the regenerative resistance control circuit 64. The regenerative resistance control circuit 64 controls a connection operation to connect the regenerative resistor 63 to the power supply wiring 61 (an operation to cause the regenerative resistor 63 to be electrically connected to the power supply wiring 61) and a non-connection operation (an operation to release a state in which the regenerative resistor 63 is electrically connected to the power supply wiring 61). The regenerative resistance control circuit 64 compares a voltage in the positive potential wiring 61a with a first reference voltage during the regenerative operation in the normal operation. Furthermore, the regenerative resistance control circuit 64 compares the voltage in the positive potential wiring 61a with a second reference voltage during the emergency stop. In this embodiment, the second reference voltage is variable. Similarly, the first reference voltage is variable. The regenerative resistance control circuit 64 is an example of a "voltage detector" in the claims. The second reference voltage is an example of a "predetermined reference voltage" in the claims.

An emergency stop signal is input from an emergency stop button 40 to the regenerative resistance control circuit 64 of the regenerative resistance circuit 60.

Regenerative Operation during Normal Operation

During normal operation, electric power is regenerated when a deceleration or inversion command is given to the motors 30 (see FIG. 2) of the humanoid robot 100. The regenerative resistor 63 is connected such that the voltage in the power supply wiring 61 is not excessively increased when electric power is regenerated. Thus, a portion of the regenerated electric power is consumed as heat by the regenerative resistor 63, and thus an excessive increase in the voltage in the power supply wiring 61 can be significantly reduced or prevented. Furthermore, a portion of the regenerated electric power that is not consumed as heat by the regenerative resistor 63 is stored in the power supply 70. A detailed description is given below.

During normal operation, the voltage in the positive potential wiring 61a is compared with the first reference voltage by the regenerative resistance control circuit 64. When the voltage in the positive potential wiring 61a is larger than the first reference voltage, the regenerative resistance control circuit 64 outputs a signal to the gate of the transistor Tr1 to turn on the transistor Tr1. Thus, the regenerative resistor 63 is electrically connected between the positive potential wiring 61a and the negative potential wiring 61b such that the voltage in the power supply wiring 61 decreases. On the other hand, when the voltage in the positive potential wiring 61a is equal to or lower than the first reference voltage, the regenerative resistance control circuit 64 outputs a signal to the gate of the transistor Tr1 to turn off the transistor Tr1. Thus, the connection state of the regenerative resistor 63 to the positive potential wiring 61a and the negative potential wiring 61b is released such that the voltage in the power supply wiring 61 increases. Consequently, the voltage in the positive potential wiring 61a itself is maintained at a relatively high voltage (200 V, for example) according to the first reference voltage. In other words, the first reference voltage is adjusted such that the voltage in the positive potential wiring 61a itself is maintained at 200 V, for example, during normal operation.

Dynamic Brake Weakening Control at Emergency Stop

The emergency stop of the humanoid robot 100 is described. The emergency stop refers to an operation to stop the humanoid robot 100 by a user pressing (operating) the emergency stop button 40 (see FIG. 2) to stop the motors 30. At the emergency stop, the operation of the amplifiers 81 (see FIG. 2) is stopped, and a supply of electric power from the power supply 70 is stopped. That is, electric power is not supplied to the power supply wiring 61 from the power supply 70 side. Furthermore, at the emergency stop, the regenerative resistor 63 (see FIG. 4) is connected (electrically connected) to the power supply wiring 61 such that a closed path from the positive potential wiring 61a through the amplifiers 81, the motors 30, the negative potential wiring 61b, the transistor Tr1, and the regenerative resistor 63 to the positive potential wiring 61a is formed. Consequently, electric power generated by the motors 30 (the rotational energy of the motors 30) is consumed as heat by the regenerative resistor 63, and thus the dynamic brake is applied to the motors 30. Thus, a braking force acts on the motors 30.

In this embodiment, the regenerative resistance circuit 60 is configured or programmed to perform a dynamic brake weakening control to reduce the braking force of the dynamic brake by changing the resistance value of the regenerative resistor 63 with respect to the power supply wiring 61 when the motors 30 are stopped at the emergency stop. Specifically, the regenerative resistance circuit 60 is configured or programmed to perform a dynamic brake weakening control to reduce the braking force of the dynamic brake by alternately repeating the connection operation and the non-connection operation of the regenerative resistor 63 with respect to the power supply wiring 61 to change the resistance value of the regenerative resistor 63 with respect to the power supply wiring 61 when the motors 30 are stopped at the emergency stop. That is, the regenerative resistor 63 is connected to the power supply wiring 61 to set the resistance value of the regenerative resistor 63 with respect to the power supply wiring 61 to more than 0, and the regenerative resistor 63 is disconnected from the power supply wiring 61 to set the resistance value of the regenerative resistor 63 with respect to the power supply wiring 61 to 0. Then, the connection operation and the non-connection operation of the regenerative resistor 63 with respect to the power supply wiring 61 are alternately repeated such that a state in which the braking force of the dynamic brake acts and a state in which the braking force of the dynamic brake does not act are alternately repeated. Thus, the humanoid robot 100 gradually changes its posture.

In this embodiment, the regenerative resistance circuit 60 is configured or programmed to perform a dynamic brake weakening control to reduce the braking force of the dynamic brake until the motors 30 are stopped by changing the resistance value of the regenerative resistor 63 with respect to the power supply wiring 61 (alternately repeating the connection operation and the non-connection operation) when the motors 30 are stopped at the emergency stop. That is, until the operation of the humanoid robot 100 including the waist joint 10*a*, the elbow joints 10*b*, the knee joints 10*c*, the shoulder joints 10*d*, the hip joints 10*e*, and the ankle joints 10*f* corresponding to a plurality of human joints is completely stopped, the braking force of the dynamic brake is reduced.

In this embodiment, the regenerative resistance circuit 60 is configured or programmed to perform a control to reduce the braking force of the dynamic brake until the motors 30 are stopped by changing the resistance value of the regenerative resistor 63 with respect to the power supply wiring 61 (alternately repeating the connection operation and the non-connection operation) when a fall of the humanoid robot body 100*a* is controlled. A mechanical brake (electromagnetic brake), for example, is not provided in the humanoid robot body 100*a* to fix the waist joint 10*a*, the elbow joints 10*b*, the knee joints 10*c*, the shoulder joints 10*d*, the hip joints 10*e*, and the ankle joints 10*f* of the humanoid robot body 100*a* (maintain the posture). Therefore, at the emergency stop, the humanoid robot body 100*a* finally collapses. In this embodiment, a control is performed such that the humanoid robot body 100*a* relatively gently collapses by activating the dynamic brake, the braking force of which is electrically reduced by the regenerative resistance circuit 60.

In this embodiment, the regenerative resistance circuit 60 is configured or programmed to perform a control to switch the normal operation to the operation at the emergency stop based on the emergency stop signal. Specifically, the emergency stop signal is input to the regenerative resistance control circuit 64 based on the user pressing (operating) the emergency stop button 40 (see FIG. 2), and the normal operation is switched to the operation at the emergency stop.

In this embodiment, the regenerative resistance circuit 60 performs an operation to connect the regenerative resistor 63 to the power supply wiring 61 at the emergency stop at an operating voltage lower than an operating voltage for activating the regenerative resistor 63 during normal operation. Specifically, as described above, during normal operation (during regeneration), the regenerative resistance control circuit 64 connects the regenerative resistor 63 to the power supply wiring 61 at an operating voltage of the relatively high first reference voltage to perform the regenerative operation. On the other hand, at the emergency stop, the regenerative resistance control circuit 64 connects the regenerative resistor 63 to the power supply wiring 61 at an operating voltage of the relatively low second reference voltage to perform an operation to apply the dynamic brake.

In this embodiment, the voltage in the power supply wiring 61 (positive potential wiring 61*a*) is detected by the regenerative resistance control circuit 64. Then, the regenerative resistance circuit 60 is configured or programmed to perform a feedback control to reduce the braking force of the dynamic brake until the motors 30 are stopped by changing the resistance value of the regenerative resistor 63 with respect to the power supply wiring 61 (alternately repeating the connection operation and the non-connection operation) based on the voltage in the power supply wiring 61 detected by the regenerative resistance control circuit 64 when the motors 30 are stopped at the emergency stop. Specifically, the regenerative resistance circuit 60 compares the voltage in the power supply wiring 61 detected by the regenerative resistance control circuit 64 with the second reference voltage when the motors 30 are stopped at the emergency stop. Then, the regenerative resistance circuit 60 alternately repeats the connection operation and the non-connection operation of the regenerative resistor 63 with respect to the power supply wiring 61 based on the comparison between the voltage in the power supply wiring 61 and the second reference voltage. Thus, a feedback control is performed to reduce the braking force of the dynamic brake until the motors 30 are stopped.

Specifically, in this embodiment, the regenerative resistance circuit 60 performs an operation to increase the resistance value of the regenerative resistor 63 with respect to the power supply wiring 61 (connect the regenerative resistor 63) when the voltage in the power supply wiring 61 (positive potential wiring 61*a*) detected by the regenerative resistance control circuit 64 exceeds the second reference voltage when the motors 30 are stopped at the emergency stop. That is, when the voltage detected by the regenerative resistance control circuit 64 exceeds the second reference voltage, the regenerative resistor 63 is connected to the power supply wiring 61 based on an H level signal output from the regenerative resistance control circuit 64. When the voltage in the power supply wiring 61 is equal to or lower than the second reference voltage, an operation is performed to decrease the resistance value of the regenerative resistor 63 with respect to the power supply wiring 61 (to disconnect the regenerative resistor 63). That is, the regenerative resistor 63 is disconnected from the power supply wiring 61 based on an L level signal output from the regenerative resistance control circuit 64 when the voltage detected by the regenerative resistance control circuit 64 is equal to or lower than the second reference voltage.

In this embodiment, the regenerative resistance circuit 60 includes the transistor Tr1 to switch between the connection state and the non-connection state of the regenerative resistor 63 with respect to the power supply wiring 61. When the motors 30 are stopped at the emergency stop, the transistor Tr1 alternately repeats an on operation and an off operation based on the second reference voltage such that the connection operation and the non-connection operation of the regenerative resistor 63 with respect to the power supply wiring 61 are alternately repeated. That is, when the voltage detected by the regenerative resistance control circuit 64 exceeds the second reference voltage, the transistor Tr1 is turned on based on the H level signal output from the regenerative resistance control circuit 64. Thus, the regenerative resistor 63 is connected to the power supply wiring 61. When the voltage detected by the regenerative resistance control circuit 64 is equal to or lower than the second reference voltage, the transistor Tr1 is turned off based on the L level signal output from the regenerative resistance control circuit 64. Thus, the regenerative resistor 63 is disconnected from the power supply wiring 61.

When the voltage in the positive potential wiring 61a is larger than the first reference voltage, the regenerative resistor 63 is electrically connected between the positive potential wiring 61a and the negative potential wiring 61b such that the voltage in the power supply wiring 61 decreases. When the voltage in the positive potential wiring 61a is equal to or lower than the second reference voltage, the connection state of the regenerative resistor 63 to the positive potential wiring 61a and the negative potential wiring 61b is released such that the voltage in the power supply wiring 61 increases. Consequently, the voltage in the positive potential wiring 61a itself is maintained at a voltage corresponding to the relatively low second reference voltage (30 V or more and 60 V or less, for example). In other words, the second reference voltage is adjusted such that the voltage in the positive potential wiring 61a itself is maintained at a predetermined voltage of 30 V or more and 60 V or less, for example, at the emergency stop. Thus, the braking force of the dynamic brake acting by connections of the regenerative resistor 63 to the positive potential wiring 61a and the negative potential wiring 61b becomes relatively small. That is, the braking force of the dynamic brake is weakened as compared with a case in which the voltage in the positive potential wiring 61a itself is relatively large (such as 200 V) as in normal operation.

In this embodiment, the regenerative resistance circuit 60 collectively controls the braking force of the dynamic brake for the plurality of motors 30 by changing the resistance value of the regenerative resistor 63 provided in common for the plurality of motors 30 with respect to the power supply wiring 61 (alternately repeating the connection operation and the non-connection operation) when the motors 30 are stopped at the emergency stop. That is, the regenerative resistor 63 is provided in common for the plurality of motors 30, and thus the braking force of the dynamic brake generated by a connection of the regenerative resistor 63 is substantially the same for each of the plurality of motors 30. The regenerative resistor 63 is connected such that the dynamic brake is applied to all the motors 30. Furthermore, the regenerative resistor 63 is disconnected such that activation of the dynamic brake for all the motors 30 is stopped.

A supply of electric power is stopped during the emergency stop, and thus it may be difficult to ensure the reliability of the operation to reduce the braking force of the dynamic brake when the operation to reduce the braking force of the dynamic brake is performed by software. Therefore, at the emergency stop, the regenerative resistance control circuit 64 performs the operation to reduce the braking force of the dynamic brake by hardware using a comparator (not shown), for example, such that the reliability of the operation to reduce the braking force of the dynamic brake can be improved.

Release of State at Emergency Stop

After the operation at the emergency stop is performed, a dynamic brake release signal is input to the regenerative resistance circuit 60 (see FIG. 4) such that the same operation as that during normal operation is performed. That is, application of the dynamic brake is released, and the regenerative operation during normal operation becomes possible.

Fall Control Method

A fall control method for the humanoid robot 100 at the emergency stop is now described with reference to FIGS. 1, 4, and 5.

Figure 5:
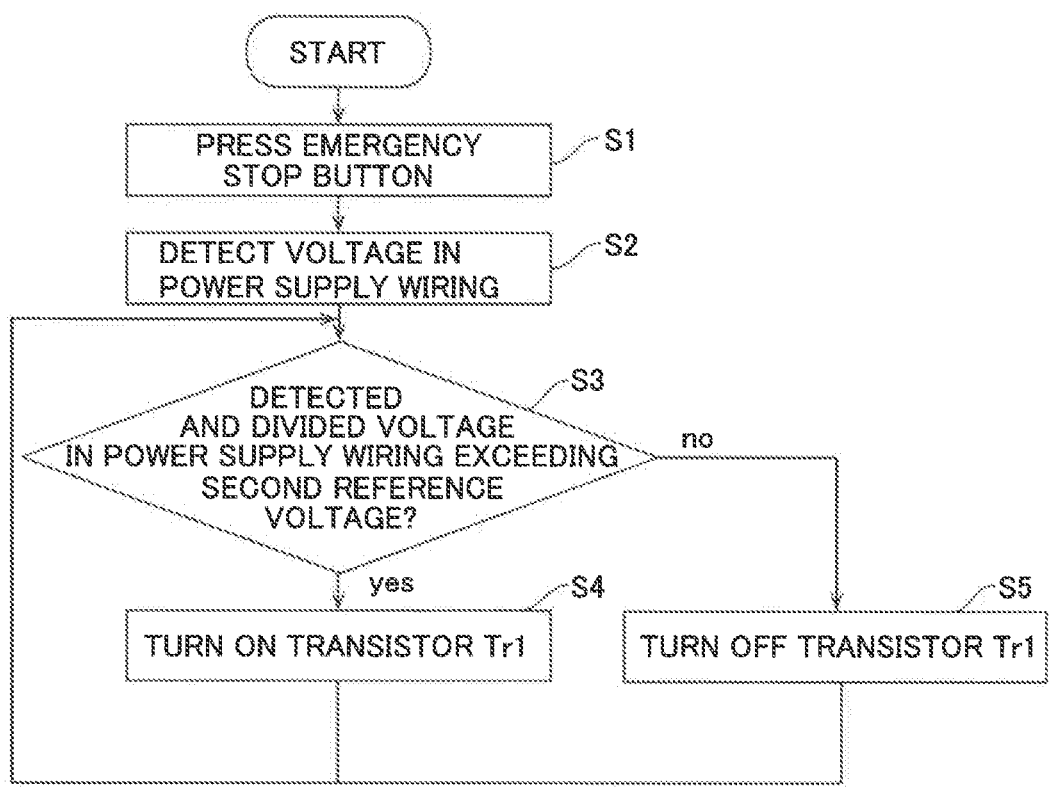
FIG. 5 is a flowchart illustrating a humanoid robot fall control method according to the embodiment of the present invention.

In step S1 shown in FIG. 5, when the emergency stop button 40 is pressed, the regenerative resistance control circuit 64 (see FIG. 4) is put into a state of comparing the voltage in the positive potential wiring 61a with the second reference voltage.

In step S2, the voltage in the power supply wiring 61 that supplies electric power to the plurality of motors 30 provided in the waist joint 10a, the elbow joints 10b, the knee joints 10c, the shoulder joints 10d, the hip joints 10e, and the ankle joints 10f is detected by the regenerative resistance control circuit 64.

In step S3, in the regenerative resistance control circuit 64, the voltage in the power supply wiring 61 detected by the regenerative resistance control circuit 64 is compared with the second reference voltage.

Then, in this embodiment, the resistance value of the regenerative resistor 63 with respect to the power supply wiring 61 is changed based on the detected voltage in the power supply wiring 61 (the connection operation and the non-connection operation are alternately repeated) such that a feedback control is performed to reduce the braking force of the dynamic brake. Specifically, in step S3, when the voltage in the power supply wiring 61 detected by the regenerative resistance control circuit 64 is larger than the second reference voltage, the process advances to step S4, and the transistor Tr1 is turned on. Thus, the regenerative resistor 63 is connected to the power supply wiring 61. In step S3, when the voltage in the power supply wiring 61 detected by the regenerative resistance control circuit 64 is equal to or lower than the second reference voltage, the process advances to step S5, and the transistor Tr1 is turned off. Thus, the regenerative resistor 63 is disconnected from the power supply wiring 61.

The operations in step S3 to step S5 are continued until the motors 30 are stopped. Thus, a feedback control is performed to reduce the braking force of the dynamic brake until the motors 30 are stopped.

The operation in which the humanoid robot 100 falls at the emergency stop is now specifically described.

For example, as shown in FIG. 1, it is assumed that the humanoid robot 100 stands upright at a time point before the emergency stop. When the emergency stop button 40 (see FIG. 2) is pressed in this state, a supply of electric power to the amplifiers 81 and the motors 30 is stopped. Furthermore, when the emergency stop button 40 is pressed, the regenerative resistance control circuit 64 (see FIG. 4) of the regenerative resistance circuit 60 is put into a state of comparing the voltage in the positive potential wiring 61a with the second reference voltage.

Figure 6:
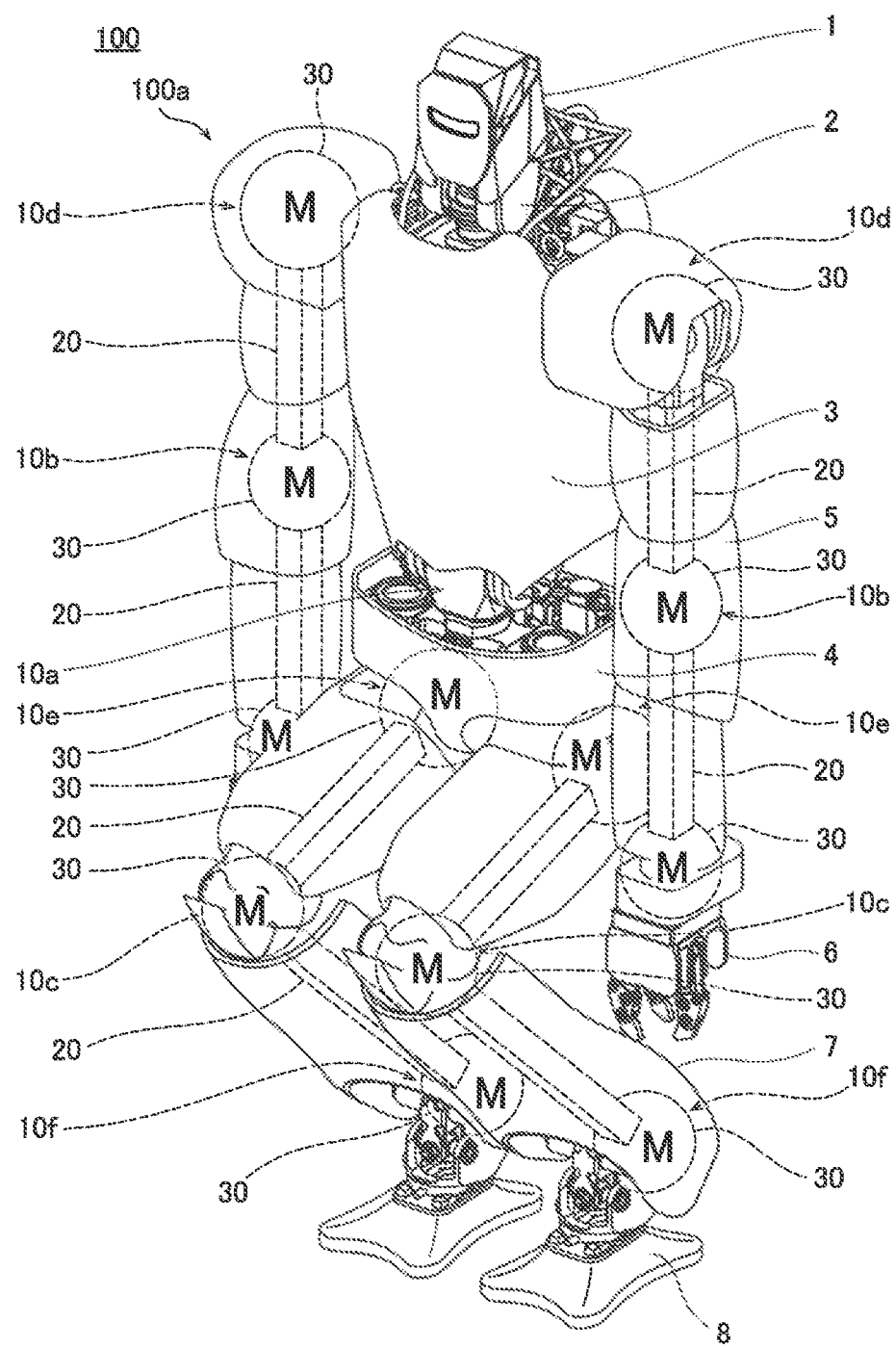
FIG. 6 is a diagram showing the humanoid robot crouching down according to the embodiment of the present invention.

In the humanoid robot 100, a mechanical electromagnetic brake is not provided to fix the waist joint 10a, the elbow joints 10b, the knee joints 10c, the shoulder joints 10d, the hip joints 10e, and the ankle joints 10f (motors 30) (i.e., maintain the posture), and thus a supply of electric power to the amplifiers 81 and the motors 30 is stopped such that the humanoid robot 100 cannot maintain its posture. Therefore, the humanoid robot 100 collapses from an upright state so as to bend the knee joints 10c and the hip joints 10e of the legs 7 and the ankle joints 10f of the feet 8, as shown in FIG. 6.

When the knee joints 10c, the hip joints 10e, and the ankle joints 10f are bent, a supply of electric power to the motors 30 is stopped, and thus the motors 30 operate to generate electric power. When the knee joints 10c, the hip joints 10e, and the ankle joints 10f are bent, the rotation speeds of the motors 30 gradually increase, and the generated electric power (voltage) increases. The generated electric power is supplied to the power supply wiring 61. Thus, the voltage in the power supply wiring 61 also increases. The voltage in the power supply wiring 61 (positive potential wiring 61a) is detected by the regenerative resistance control circuit 64.

Then, the connection operation and the non-connection operation of the regenerative resistor 63 that activates the dynamic brake with respect to the power supply wiring 61 are alternately repeated based on the detected voltage in the power supply wiring 61 (positive potential wiring 61a) such that a feedback control is performed to reduce the braking force of the dynamic brake. The second reference voltage is set relatively low, and thus the dynamic brake for the motors 30 starts to be applied with the relatively low rotation speeds of the motors 30, and the braking force of the dynamic brake is relatively weak. Thus, the humanoid robot 100 stops its operation after the humanoid robot 100 changes its posture so as to gently bend the knee joints 10c, the hip joints 10e, and the ankle joints 10f. After that, the humanoid robot 100 collapses (falls). Thus, the humanoid robot 100 stops relatively gently, and thus a vigorous fall of the humanoid robot 100 is significantly reduced or prevented.

Figure 7:
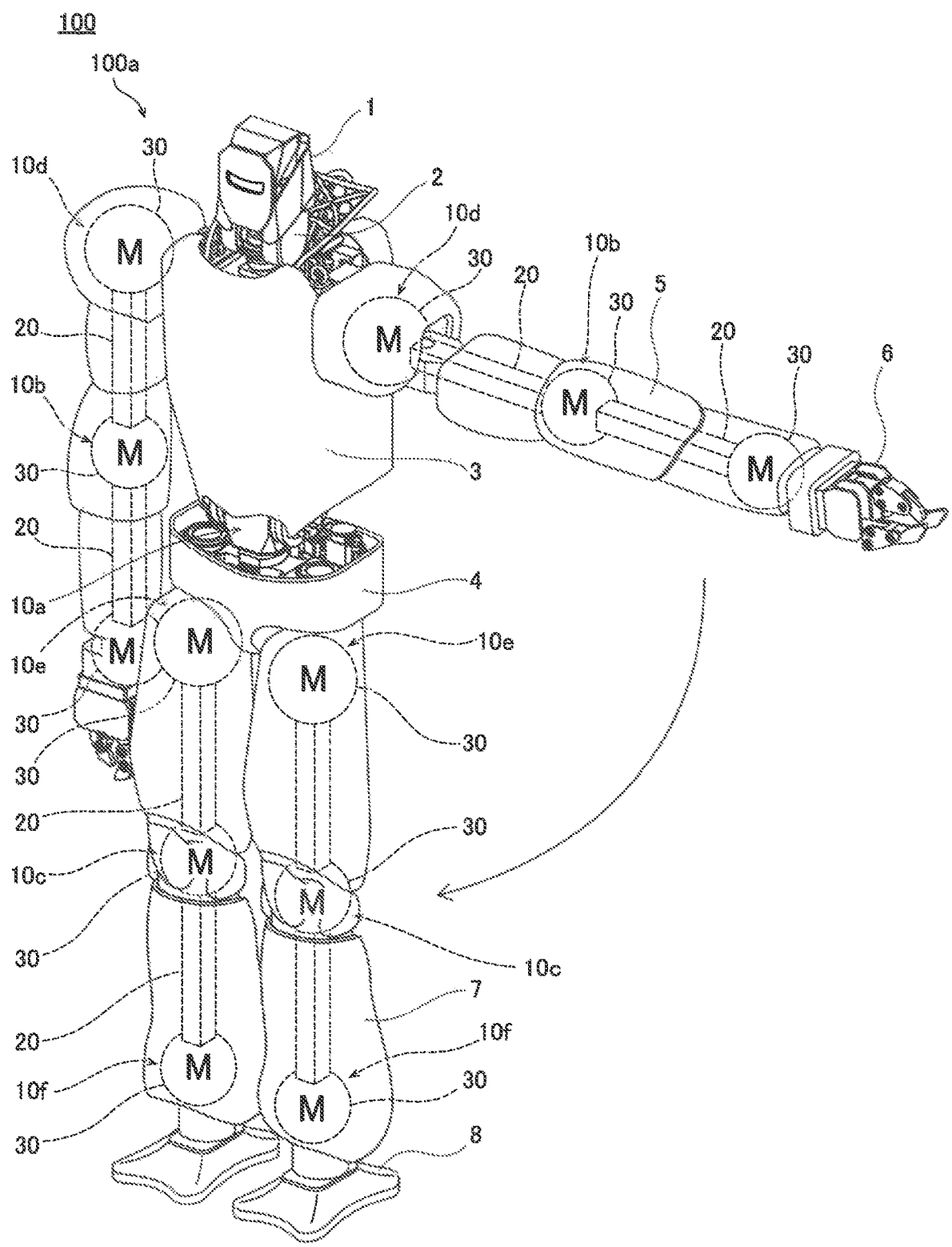
FIG. 7 is a diagram showing the humanoid robot with an arm placed along a horizontal direction according to the embodiment of the present invention.

As shown in FIG. 7, it is assumed that one of a pair of arms 5 of the humanoid robot 100 is placed along a horizontal direction at the time point before the emergency stop. When the emergency stop button 40 is pressed in the state of the humanoid robot 100 shown in FIG. 7, the knee joints 10c, the hip joints 10e, and the ankle joints 10f are also bent as described above, but a case in which only the posture of the arm 5 changes without bending the knee joints 10c, the hip joints 10e, and the ankle joints 10f is described for the sake of simplification of the description.

When the emergency stop button 40 is pressed in this state, a supply of electric power to the amplifiers 81 and the motors 30 is stopped. In the humanoid robot 100, a brake is not provided to fix the shoulder joints 10d, and thus the shoulder joint 10d rotates due to the weight of the arm 5. Thus, the arm 5 placed along the horizontal direction rotates around the shoulder joint 10d in an arc. At this time, a supply of electric power to the motors 30 is stopped, and thus the motors 30 operate to generate electric power. Then, with the shoulder joint 10d rotating, the voltage in the power supply wiring 61 is compared with the second reference voltage by the regenerative resistance control circuit 64, and the connection operation and the non-connection operation of the regenerative resistor 63 are alternately repeated. Thus, the braking force of the dynamic brake is weakened, and thus the arm 5 rotates relatively gently around the shoulder joint 10d and then stops. Thus, the arm 5 stops relatively gently, and thus vigorous collision of the arm 5 with the upper torso 3 or the lower torso 4, for example, is significantly reduced or prevented.

When the emergency stop button 40 is pressed while the humanoid robot 100 is in motion (when the rotation speeds of the motors 30 are relatively high), the voltage of the electric power generated by the motors 30 is relatively high, and thus the dynamic brake is applied. Thus, the connection operation and the non-connection operation of the regenerative resistor 63 are alternately repeated in a state in which the rotation speeds of the motors 30 decrease, and the voltage of the generated electric power decreases to the vicinity of the second reference voltage. Thus, the braking force of the dynamic brake is weakened. Consequently, a fall of the humanoid robot 100 with the joints of the humanoid robot 100 being fixed (rigor state) is significantly reduced or prevented.

Advantages of This Embodiment

According to this embodiment, the following advantages are achieved.

According to this embodiment, as described above, the regenerative resistance circuit 60 is configured or programmed to perform a control to reduce the braking force of the dynamic brake by changing the resistance value of the regenerative resistor 63 with respect to the power supply wiring 61 when the motors 30 are stopped at the emergency stop. Accordingly, when the motors 30 are stopped at the emergency stop, the braking force of the dynamic brake is reduced, and thus the humanoid robot 100 stops relatively gently. Thus, a vigorous fall of the humanoid robot 100 is significantly reduced or prevented. That is, the humanoid robot 100 gently collapses.

Consequently, damage to the humanoid robot 100 at the emergency stop can be significantly reduced or prevented.

When the braking force of the dynamic brake is too strong, the humanoid robot 100 may fall with the waist joint 10a, the elbow joints 10b, the knee joints 10c, the shoulder joints 10d, the hip joints 10e, and the ankle joints 10f of the humanoid robot 100 being fixed by the strong braking force of the dynamic brake. This may also damage the humanoid robot 100. On the other hand, in the humanoid robot 100 according to this embodiment, a control is performed to reduce the braking force of the dynamic brake, as described above, such that fixing of the waist joint 10a, the elbow joints 10b, the knee joints 10c, the shoulder joints 10d, the hip joints 10e, and the ankle joints 10f by the strong braking force of the dynamic brake is significantly reduced or prevented, and thus damage to the humanoid robot 100 caused by the fall of the humanoid robot 100 with the waist joint 10a, the elbow joints 10b, the knee joints 10c, the shoulder joints 10d, the hip joints 10e, and the ankle joints 10f being fixed can be significantly reduced or prevented. In particular, in the humanoid robot 100, fixing of the joints (the shoulder joints 10d and the knee joints 10c) by the strong braking force with the arms 5 being raised and the knees 9a being extended can be significantly reduced or prevented, and the humanoid robot 100 can fall while the arms 5 are gradually lowered and the knees 9a are gradually bent (crouched down) by the reduced weak braking force. Thus, damage especially to the humanoid robot 100 caused by a fall can be effectively significantly reduced or prevented.

According to this embodiment, as described above, the regenerative resistance circuit 60 is configured or programmed to perform a control to change the resistance value of the regenerative resistor 63 with respect to the power supply wiring 61 by alternately repeating the connection operation and the non-connection operation of the regenerative resistor 63 with respect to the power supply wiring 61 to reduce the braking force of the dynamic brake when the motors 30 are stopped at the abnormal stop. Accordingly, the braking force of the dynamic brake can be easily reduced only by alternately repeating the connection operation and the non-connection operation of the regenerative resistor 63 with respect to the power supply wiring 61.

According to this embodiment, as described above, the regenerative resistance circuit 60 includes the regenerative resistor 63 that consumes the regenerative energy generated in the motors 30. Accordingly, during normal operation, the dynamic brake at the emergency stop can be applied using the regenerative resistor 63 that consumes the regenerative energy generated in the regenerative operation performed at the time of deceleration of the humanoid robot 100, for example. Accordingly, unlike a case in which a regenerative resistor 63 used for the regenerative operation during normal operation and a resistor for applying the dynamic brake at the emergency stop are separately provided, a complex circuit configuration of the humanoid robot 100 can be significantly reduced or prevented.

According to this embodiment, as described above, the regenerative resistance circuit 60 performs an operation to connect the regenerative resistor 63 to the power supply wiring 61 at the emergency stop at an operating voltage lower than the operating voltage for activating the regenerative resistor 63 during normal operation.

Accordingly, the dynamic brake is applied with the relatively small rotation speeds of the motors 30 (with the small power generation voltages of the motors 30), and thus the dynamic brake can be applied before the posture of the humanoid robot 100 changes significantly. That is, at the emergency stop, the humanoid robot 100 is stopped while the posture of the humanoid robot 100 is gradually changed. Thus, collision of one portion (the arms 5, for example) of the humanoid robot 100 itself with another portion (the upper torso 3 or the lower torso 4, for example) with a strong force due to a sudden change in the posture of the humanoid robot 100 can be significantly reduced or prevented. Consequently, damage to the humanoid robot 100 due to a delay (ineffectiveness) of application of the dynamic brake can be significantly reduced or prevented.

According to this embodiment, as described above, the regenerative resistance circuit 60 is configured or programmed to perform a control to switch the normal operation to the operation at the emergency stop based on the emergency stop signal. Accordingly, the normal operation can be immediately switched to the operation at the emergency stop based on the emergency stop signal, and thus the dynamic brake can be quickly applied to the motors 30 at the emergency stop.

According to this embodiment, as described above, the regenerative resistance circuit 60 is configured or programmed to perform a control to reduce the braking force of the dynamic brake until the motors 30 are stopped by changing the resistance value of the regenerative resistor 63 with respect to the power supply wiring 61 (alternately repeating the connection operation and the non-connection operation) when the motors 30 are stopped at the emergency stop. Accordingly, the braking force of the dynamic brake can be reduced until the operation of the humanoid robot 100 is stopped by stopping of the motors 30, and thus an increase in the braking force of the dynamic brake at an interim stage before the operation of the humanoid robot 100 is completely stopped can be significantly reduced or prevented. Consequently, a vigorous fall of the humanoid robot 100 due to an increase in the braking force of the dynamic brake at the interim stage before the operation of the humanoid robot 100 is completely stopped can be significantly reduced or prevented.

According to this embodiment, as described above, the humanoid robot body 100a includes the waist joint 10a, the elbow joints 10b, the knee joints 10c, the shoulder joints 10d, the hip joints 10e, and the ankle joints 10f corresponding to a plurality of human joints. The humanoid robot 100 (humanoid robot body 100a) walks on two legs, and thus it relatively easily falls. Therefore, as described above, performing a control to reduce the braking force of the dynamic brake at the emergency stop is particularly effective in significantly reducing or preventing damage to the humanoid robot 100, which relatively easily falls.

According to this embodiment, as described above, the regenerative resistance circuit 60 is configured or programmed to perform a control to reduce the braking force of the dynamic brake until the motors 30 are stopped by changing the resistance value of the regenerative resistor 63 with respect to the power supply wiring 61 (alternately repeating the connection operation and the non-connection operation) when a fall of the humanoid robot body 100a is controlled. Accordingly, when the fall of the humanoid robot body 100a is controlled, the braking force of the dynamic brake is reduced during the fall operation, and thus the humanoid robot body 100a can be controlled to collapse relatively gently.

According to this embodiment, as described above, the humanoid robot 100 further includes the regenerative resistance control circuit 64 to detect the voltage in the power supply wiring 61, and the regenerative resistance circuit 60 is configured or programmed to perform a feedback control to reduce the braking force of the dynamic brake until the motors 30 are stopped by changing the resistance value of the regenerative resistor 63 with respect to the power supply wiring 61 (alternately repeating the connection operation and the non-connection operation) based on the voltage in the power supply wiring 61 detected by the regenerative resistance control circuit 64 when the motors 30 are stopped at the emergency stop. As the rotation speeds of the motors 30 increase, the voltage of the electric power generated by the motors 30 (the voltage in the power supply wiring 61) increases. Therefore, as described above, the connection operation and the non-connection operation of the regenerative resistor 63 with respect to the power supply wiring 61 are alternately repeated based on the voltage in the power supply wiring 61 detected by the regenerative resistance control circuit 64 such that an excessive increase in the rotation speeds (voltages) of the motors 30 can be significantly reduced or prevented. Thus, an excessive increase in the braking force of the dynamic brake for the motors 30 can be significantly reduced or prevented.

According to this embodiment, as described above, the regenerative resistance circuit 60 is configured or programmed to perform a feedback control to reduce the braking force of the dynamic brake until the motors 30 are stopped by changing the resistance value of the regenerative resistor 63 with respect to the power supply wiring 61 (alternately repeating the connection operation and the non-connection operation) based on a comparison between the voltage in the power supply wiring 61 detected by the regenerative resistance control circuit 64 and the second reference voltage when the motors 30 are stopped at the emergency stop. Accordingly, an increase in the voltage of the electric power generated by the motors 30 to larger than the voltage corresponding to the second reference voltage is significantly reduced or prevented, and the voltage of the electric power generated by the motors 30 is maintained at a voltage close to the voltage corresponding to the second reference voltage. Therefore, the braking force of the dynamic brake for the motors 30 can be maintained at a desired weak magnitude.

According to this embodiment, as described above, the regenerative resistance circuit 60 is configured or programmed to, when the motors 30 are stopped at the emergency stop, perform a feedback control to reduce the braking force of the dynamic brake until the motors 30 are stopped by performing an operation to increase the resistance value of the regenerative resistor 63 with respect to the power supply wiring 61 (to connect the regenerative resistor 63) when the voltage in the power supply wiring 61 detected by the regenerative resistance control circuit 64 exceeds the second reference voltage, and performing an operation to decrease the resistance value of the regenerative resistor 63 with respect to the power supply wiring 61 (to disconnect the regenerative resistor 63) when the voltage in the power supply wiring 61 is equal to or lower than the second reference voltage. Accordingly, when the voltage in the power supply wiring 61 detected by the regenerative resistance control circuit 64 exceeds the second reference voltage, the regenerative resistor 63 is connected to the power supply wiring 61, and thus the voltage in the power supply wiring 61 can be decreased. When the voltage in the power supply wiring 61 is equal to or lower than the second reference voltage, the regenerative resistor 63 is disconnected to the power supply wiring 61, and thus the voltage in the power supply wiring 61 can be increased. Thus, the voltage of the electric power generated by the motors 30 can be easily maintained at a voltage close to the voltage corresponding to the second reference voltage.

According to this embodiment, as described above, the regenerative resistance circuit 60 further includes the transistor Tr1 to switch between the connection state and the non-connection state of the regenerative resistor 63 with respect to the power supply wiring 61, and the regenerative resistance circuit 60 is configured or programmed to perform a control to reduce the braking force of the dynamic brake until the motors 30 are stopped by alternately repeating the on operation and the off operation of the transistor Tr1 based on the second reference voltage to alternately repeat the connection operation and the non-connection operation of the regenerative resistor 63 with respect to the power supply wiring 61 when the motors 30 are stopped at the emergency stop. Accordingly, switching between the on operation and the off operation of the transistor Tr1 is simply performed such that switching between the connection state and the non-connection state of the regenerative resistor 63 with respect to the power supply wiring 61 can be easily performed.

According to this embodiment, as described above, the second reference voltage is variable. Accordingly, the second reference voltage can be changed according to the specifications of the motors 30 provided in the waist joint 10a, the elbow joints 10b, the knee joints 10c, the shoulder joints 10d, the hip joints 10e, and the ankle joints 10f of the humanoid robot 100, and thus the braking force of the dynamic brake can be appropriately reduced according to the specifications of the motors 30, for example.

According to this embodiment, as described above, the regenerative resistor 63 is provided in common for the plurality of motors 30 provided for the waist joint 10a, the elbow joints 10b, the knee joints 10c, the shoulder joints 10d, the hip joints 10e, and the ankle joints 10f, and the regenerative resistance circuit 60 is configured or programmed to collectively control the braking force of the dynamic brake for the plurality of motors 30 by changing the resistance value of the regenerative resistor 63 provided in common for the plurality of motors 30 with respect to the power supply wiring 61 (alternately repeating the connection operation and the non-connection operation) when the motors 30 are stopped at the emergency stop. Accordingly, unlike a case in which the regenerative resistor 63 is individually provided for the plurality of motors 30, an increase in the number of components of the regenerative resistance circuit 60 of the humanoid robot 100 and a complex circuit configuration of the regenerative resistance circuit 60 can be significantly reduced or prevented. Therefore, the size of the humanoid robot 100 can be reduced.

According to this embodiment, as described above, the fall control method for the humanoid robot 100 includes performing a feedback control to reduce the braking force of the dynamic brake by changing the resistance value of the regenerative resistor 63 with respect to the power supply wiring 61 in the regenerative resistance circuit 60 that activates the dynamic brake by consuming the electric energy generated by rotation of the motors 30 by the regenerative resistor 63 that is electrically connectable to the power supply wiring 61, based on the detected voltage in the power supply wiring 61. Accordingly, the braking force of the dynamic brake is reduced when the motors 30 are stopped at the emergency stop, and thus it is possible to provide the fall control method for the humanoid robot 100 capable of significantly reducing or preventing damage to the humanoid robot 100 caused by the vigorous fall of the humanoid robot 100 at the emergency stop. Furthermore, fixing of the waist joint 10a, the elbow joints 10b, the knee joints 10c, the shoulder joints 10d, the hip joints 10e, and the ankle joints 10f by the strong braking force of the dynamic brake is significantly reduced or prevented, and thus it is possible to provide the fall control method for the humanoid robot 100 capable of significantly reducing or preventing damage to the humanoid robot 100 caused by the fall of the humanoid robot 100 with the waist joint 10a, the elbow joints 10b, the knee joints 10c, the shoulder joints 10d, the hip joints 10e, and the ankle joints 10f being fixed. Moreover, fixing of the joints (the shoulder joints 10d and the knee joints 10c) by the strong braking force with the arms 5 being raised and the knees 9a being extended can be significantly reduced or prevented, and the humanoid robot 100 can fall while the arms 5 are gradually lowered and the knees 9a are gradually bent (crouched down) by the reduced weak braking force. Thus, it is possible to provide the fall control method for the humanoid robot 100 capable of effectively significantly reducing or preventing damage to the humanoid robot 100 caused by the fall of the humanoid robot 100.

Modified Examples

The embodiment disclosed this time must be considered as illustrative in all points and not restrictive. The scope of the present invention is not shown by the above description of the embodiment but by the scope of claims for patent, and all modifications (modified examples) within the meaning and scope equivalent to the scope of claims for patent are further included.

For example, while the example in which the present invention is applied to the humanoid robot 100 has been shown in the aforementioned embodiment, the present invention is not limited to this. For example, the present invention may be applied to a bipedal walking robot or a quadrupedal walking robot that imitates an animal other than the humanoid robot 100. When the present invention is applied to a quadrupedal walking robot, the impact of the emergency stop can be mitigated, and thus damage to the quadrupedal walking robot at the abnormal stop can be significantly reduced or prevented.

While the example in which a control is performed to reduce the braking force of the dynamic brake by alternately repeating the connection operation and the non-connection operation of the regenerative resistor 63 with respect to the power supply wiring 61 has been shown in the aforementioned embodiment, the present invention is not limited to this. For example, a control may be performed to reduce the braking force of the dynamic brake by changing the resistance value of the regenerative resistor that is constantly connected to the power supply wiring 61. That is, a control may be performed to reduce the braking force of the dynamic brake by increasing the resistance value of the regenerative resistor when the voltage in the power supply wiring 61 exceeds the second reference voltage and decreasing the resistance value of the regenerative resistor when the voltage in the power supply wiring 61 is equal to or lower than the second reference voltage.

While the example in which the regenerative resistor 63 is used as the "resistance component" according to the present invention has been shown in the aforementioned embodiment, the present invention is not limited to this. For example, a resistance component of a semiconductor element may be used as the "resistance component" according to the present invention.

While the example in which the dynamic brake is applied using the regenerative resistor 63 provided in advance in the humanoid robot 100 to consume regenerative energy has been shown in the aforementioned embodiment, the present invention is not limited to this. For example, in addition to the regenerative resistor 63 that consumes regenerative energy, a dedicated resistor for applying the dynamic brake may be provided. In this case, a resistance circuit including such a dedicated resistor may be provided separately from the regenerative resistance circuit.

While the example in which the regenerative resistor 63 is connected to the power supply wiring 61 has been shown in the aforementioned embodiment, the present invention is not limited to this. For example, the regenerative resistor 63 may be connected to wiring that connects the motors 30 to the amplifiers 81.

While the example in which the second reference voltage, which is a reference for connecting the regenerative resistor 63 to the power supply wiring 61 at the emergency stop, is lower than the first reference voltage, which is a reference for activating the regenerative resistor 63 during normal operation, has been shown in the aforementioned embodiment, the present invention is not limited to this. For example, when the first reference voltage, which is a reference for activating the regenerative resistor 63 during normal operation, is relatively low, the second reference voltage may be substantially the same as the first reference voltage.

While the example in which when the emergency stop button 40 is pressed by the user, the humanoid robot 100 is caused to make an emergency stop has been shown in the aforementioned embodiment, the present invention is not limited to this. For example, a sensor may be provided in the humanoid robot 100, and the humanoid robot 100 may be caused to automatically make an emergency stop based on the sensor detecting the posture or movement of the humanoid robot 100. Furthermore, when an abnormality occurs in the humanoid robot 100, a control may be performed to reduce the braking force of the dynamic brake until the motors 30 are stopped.

While the example in which when the motors 30 are stopped at the emergency stop, the connection operation and the non-connection operation of the regenerative resistor 63 with respect to the power supply wiring 61 are alternately repeated based on the voltage in the power supply wiring 61 has been shown in the aforementioned embodiment, the present invention is not limited to this. For example, the rotation speeds of the motors 30 may be detected, and the connection operation and the non-connection operation of the regenerative resistor 63 with respect to the power supply wiring 61 may be alternately repeated based on the detected rotation speeds of the motors.

While the example in which the on operation and the off operation of the transistor Tr1 are alternately repeated such that the connection operation and the non-connection operation of the regenerative resistor 63 with respect to the power supply wiring 61 are alternately repeated has been shown in the aforementioned embodiment, the present invention is not limited to this. For example, a switch (such as a relay) other than the transistor Tr1 may be used to alternately repeat the connection operation and the non-connection operation of the regenerative resistor 63 with respect to the power supply wiring 61.

While the example in which the first reference voltage and the second reference voltage are variable has been shown in the aforementioned embodiment, the present invention is not limited to this. For example, the first reference voltage and the second reference voltage may be fixed.

While the example in which the regenerative resistor 63 is provided in common for the plurality of motors 30 has been shown in the aforementioned embodiment, the present invention is not limited to this. For example, the regenerative resistor 63 may be individually provided for the plurality of motors 30. Thus, the braking force of the dynamic brake can be individually controlled for each of the waist joint 10*a*, the elbow joints 10*b*, the knee joints 10*c*, the shoulder joints 10*d*, the hip joints 10*e*, and the ankle joints 10*f*.

DESCRIPTION OF REFERENCE NUMERALS

10*a*: waist joint (joint)
10*b*: elbow joint (joint)
10*c*: knee joint (joint)
10*d*: shoulder joint (joint)
10*e*: hip joint (joint)
10*f*: ankle joint (joint)
30: motor
60: regenerative resistance circuit (resistance circuit)
61: power supply wiring (power supply path)
63: regenerative resistor (resistance component)
64: regenerative resistance control circuit (voltage detector)
100: humanoid robot (robot)
100*a*: humanoid robot body (robot body)
Tr1: transistor (switch)

The invention claimed is:

1. A robot comprising:
a robot body including a plurality of joints;
a plurality of motors provided in the plurality of joints; and
a resistance circuit including a resistance component electrically connectable to a power supply path that supplies electric power to the motors to consume electric energy generated by rotation of the motors, the resistance circuit activating a dynamic brake by consuming the electric energy by the resistance component; wherein
the resistance circuit is configured or programmed to perform a control to reduce a braking force of the dynamic brake by changing a resistance value of the resistance component with respect to the power supply path when the motors are stopped at an abnormal stop, and
the resistance circuit is configured or programmed to perform a control to reduce the braking force of the dynamic brake until the motors are stopped by changing the resistance value of the resistance component with respect to the power supply path when a fall of the robot body is controlled.

2. The robot according to claim 1, wherein the resistance circuit is configured or programmed to perform a control to change the resistance value of the resistance component with respect to the power supply path by alternately repeating a connection operation and a non-connection operation of the resistance component with respect to the power supply path to reduce the braking force of the dynamic brake when the motors are stopped at the abnormal stop.

3. The robot according to claim 1, wherein the resistance circuit includes a regenerative resistance circuit including a regenerative resistor to consume regenerative energy generated in the motors.

4. The robot according to claim 3, wherein the regenerative resistance circuit performs an operation to connect the regenerative resistor to the power supply path at the abnormal stop at an operating voltage lower than an operating voltage for activating the regenerative resistor during normal operation.

5. The robot according to claim 4, wherein the resistance circuit is configured or programmed to perform a control to switch the normal operation to the operation at the abnormal stop based on an abnormal stop signal.

6. The robot according to claim 1, wherein the resistance circuit is configured or programmed to perform a control to reduce the braking force of the dynamic brake until the motors are stopped by changing the resistance value of the resistance component with respect to the power supply path when the motors are stopped at the abnormal stop.

7. The robot according to claim 6, wherein the robot body includes a humanoid robot body including the plurality of joints corresponding to a plurality of human joints.

8. A robot comprising:
a robot body including a plurality of joints;
a plurality of motors provided in the plurality of joints;
a resistance circuit including a resistance component electrically connectable to a power supply path that supplies electric power to the motors to consume electric energy generated by rotation of the motors, the resistance circuit activating a dynamic brake by consuming the electric energy by the resistance component; and
a voltage detector to detect a voltage in the power supply path; wherein
the resistance circuit is configured or programmed to perform a control to reduce a braking force of the dynamic brake by changing a resistance value of the resistance component with respect to the power supply path when the motors are stopped at an abnormal stop,
the resistance circuit is configured or programmed to perform a feedback control to reduce the braking force of the dynamic brake until the motors are stopped by changing the resistance value of the resistance component with respect to the power supply path based on the voltage in the power supply path detected by the voltage detector when the motors are stopped at the abnormal stop,
the resistance circuit is configured or programmed to perform a feedback control to reduce the braking force of the dynamic brake until the motors are stopped by changing the resistance value of the resistance component with respect to the power supply path based on a comparison between the voltage in the power supply path detected by the voltage detector and a predetermined reference voltage when the motors are stopped at the abnormal stop, and
the resistance circuit is configured or programmed to, when the motors are stopped at the abnormal stop, perform a feedback control to reduce the braking force of the dynamic brake until the motors are stopped by performing an operation to increase the resistance value of the resistance component with respect to the power supply path when the voltage in the power supply path detected by the voltage detector exceeds the predetermined reference voltage, and performing an operation to decrease the resistance value of the resistance component with respect to the power supply path when the voltage in the power supply path is equal to or lower than the predetermined reference voltage.

9. The robot according to claim 8, wherein
the resistance circuit further includes a switch to switch between a connection state and a non-connection state of the resistance component with respect to the power supply path; and
the resistance circuit is configured or programmed to perform a control to reduce the braking force of the dynamic brake until the motors are stopped by alternately repeating an on operation and an off operation of the switch based on the predetermined reference voltage to alternately repeat a connection operation and a non-connection operation of the resistance component with respect to the power supply path when the motors are stopped at the abnormal stop.

10. The robot according to claim 8, wherein the predetermined reference voltage is variable.

11. The robot according to claim 1, wherein
the resistance component is provided in common for the plurality of motors provided for the plurality of joints; and
the resistance circuit is configured or programmed to collectively control the braking force of the dynamic brake for the plurality of motors by changing the resistance value of the resistance component provided in common for the plurality of motors with respect to the power supply path when the motors are stopped at the abnormal stop.

12. A humanoid robot comprising:
a humanoid robot body including a plurality of joints corresponding to a plurality of human joints;
a plurality of motors provided in the plurality of joints; and
a resistance circuit including a resistance component electrically connectable to a power supply path that supplies electric power to the motors to consume electric energy generated by rotation of the motors, the resistance circuit activating a dynamic brake by consuming the electric energy by the resistance component; wherein
the resistance circuit is configured or programmed to perform a control to reduce a braking force of the dynamic brake until the motors are stopped by changing a resistance value of the resistance component with respect to the power supply path when the motors are stopped at an abnormal stop associated with a fall of the humanoid robot body.

13. A robot fall control method at an abnormal stop for a robot including a plurality of joints, the robot fall control method comprising:

detecting a voltage in a power supply path that supplies electric power to a plurality of motors provided in the plurality of joints; and performing a feedback control to reduce a braking force of a dynamic brake by changing a resistance value of a resistance component with respect to the power supply path in a resistance circuit that activates the dynamic brake by consuming electric energy generated by rotation of the motors by the resistance component electrically connectable to the power supply path, based on the detected voltage in the power supply path.

* * * * *